(12) United States Patent
Osawa

(10) Patent No.: US 6,692,718 B1
(45) Date of Patent: Feb. 17, 2004

(54) METHOD FOR PREPARING NANO-SIZE PARTICULATE GRAPHITE

(75) Inventor: Eiji Osawa, Toyohashi (JP)

(73) Assignee: Futaba Corporation, Mobara (JP)

(*) Notice: Subject to any disclaimer, the term of this patent is extended or adjusted under 35 U.S.C. 154(b) by 0 days.

(21) Appl. No.: 09/926,626
(22) PCT Filed: May 26, 2000
(86) PCT No.: PCT/JP00/03391
§ 371 (c)(1), (2), (4) Date: Feb. 26, 2002
(87) PCT Pub. No.: WO00/73206
PCT Pub. Date: Dec. 7, 2000

(30) Foreign Application Priority Data

May 27, 1999 (JP) .......................................... 11/147626

(51) Int. Cl.[7] .......................... C01B 31/04; C01B 31/00; C07F 7/00
(52) U.S. Cl. ........... 423/448; 423/445 B; 423/DIG. 39; 423/DIG. 40; 204/157.44; 204/157.47; 204/157.6; 204/157.63
(58) Field of Search ....................... 204/157.44, 157.47, 204/157.63, 157.6; 423/448, 445 B, DIG. 39, DIG. 40

(56) References Cited

U.S. PATENT DOCUMENTS 5,985,232 A * 11/1999 Howard et al. .......... 423/447.3

FOREIGN PATENT DOCUMENTS

JP 9-139209 5/1997

OTHER PUBLICATIONS

Ugarte, "Curling and Closure of Graphitic Networks Under Electron–Beam Irradiation", Nature, vol. 359, Oct. 22, 1992, pp. 707–709.*

* cited by examiner

*Primary Examiner*—Edna Wong
(74) *Attorney, Agent, or Firm*—Oblon, Spivak, McClelland, Maier & Neustadt, P.C.

(57) ABSTRACT

A multi-layer fullerene, particularly a carbon nano-onion which is nano-size particulate can be produced efficiently and in high purity by irradiating soot-like carbon such as carbon black obtained by incomplete combustion or thermal cracking of carbon-containing compound such as hydrocarbon, aromatic oil and so on with high energy such as electron rays, gamma rays, X-rays, beam from an ion source and so on, and heat-treated.

13 Claims, 2 Drawing Sheets

US 6,692,718 B1

METHOD FOR PREPARING NANO-SIZE PARTICULATE GRAPHITE

TECHNICAL FIELD

The present invention relates to a novel process for preparing a carbonaceous material, and more particularly, to modification of carbon black and to a process for preparing and purifying nano-size particulate graphite, a kind of fullerene.

BACKGROUND ART

A fullerene which has received attention as new carbon is, chemically, a transformation of carbon black. Comparing the former with the latter with respect to a micro structure; the latter is formed by stacking an infinite honeycomb-shaped network plane at uniform intervals in parallel regularly in three-dimensions; contrary to this, in the case of the former a closed minimum unit system corresponding to a molecule can be strictly defined and the individual system is composed of, in principle, polyhedron-type network comprising arbitrary number of hexagon and 12 pentagons. For such a unique structure, the fullerene has been investigated as a new material of the twenty-first century in each field and it has been expected that the fullerene can be applied in a wide variety of fields from a superconductor, semiconductor and nonlinear optical material down to new type fuel and novel pharmaceutical active substances.

Form of the fullerene can be divided into spherical-type and tube-type. And mono layer-type and multi-layer type are known in each type. An active basic research has been developed everywhere in the world on $C_{60}$, $C_{70}$ and mono-layer and multi-layer carbon nano-tubes as objects. Papers of 13,000 and above have been printed and published from 1990 and 1991 when these two forms of fullerene carbon has been isolated for the first time up to the present time. Nobel Prize for chemistry was awarded for discovery of $C_{60}$. From such facts as above described, strength of impact given by the appearance of fullerene carbon to a scientific and technological field can be surmised. Examining, however, aspects of the applications of the fullerene, it can be said that there are many technical problems to be solved from the standpoint of industrial aspect, for example the production cost of $C_{60}$ and carbon nano-tube are not yet short of ¥1,000,000 per kg at present, respectively.

The fullerene is included in specific soot, that is, fullerene black obtained by subjecting a graphite electrode to arc-discharge or irradiating graphite with laser in an inactive atmosphere such as helium and so on to vaporize carbon, cooling slowly and aggregating. The form of the fullerene is generally as follows: Mono-layer sphere—Fullerene in a narrow sense shown by the general formula $C_n$, While $C_{60}$ and $C_{70}$ are representative for $C_n$, the arc many cases where $76 \leq n < 100$ is called as "higher fullerene" or $76 \leq n < 100$ is called "giant fullerene." The higher fullerene is soluble in an organic solvent and can be extracted and isolated from the fullerene black. $C_{60}$ is a true sphere having a diameter of 0.7, but the remainder is an ellipsoidal sphere or polyhedron. Multi-layer sphere—Concentric multi-layer polyhedron particles having a small cavity therein exist in the fullerene black, which are called as "carbon nano-particle." Mono-layer tube-type—This takes the form that a mono-layer fullerene is divided into two equal parts and a small wound graphite plate is inserted between them and connected. This can be formed by mixing a certain kind of metal catalyst with graphite by means of arc discharging method to vaporize, which is called as "mono-layer carbon nano-tube." Multi-layer tube-type—This has the structure that several or tens layers of mono-layer carbon nano-tubes having different thicknesses are stacked concentrically. This can be formed in a residue of cathode by arc-discharge on a graphite electrode without a catalyst. In the multi-layer sphere fullerene of the above-described fullerenes, the true sphere-type having no excess space therein has been discovered other than the above-described polyhedron type having a cavity therein. That is to say, if the fullerene black is irradiated with a concentrated electron beam in an electron microscope, a polyhedron-type carbon nano-particle contained therein changes to a substantial true sphere-type multi-concentric structure having no cavity therein. This product is called as "carbon nano-onion." Since the carbon nano-onion shows substantially perfect sphere, it has been expected to have more interesting performance than the polyhedron-type carbon nano-particle, and it is called as "ultimate fullerene."

Each of the concentric polyhedron-type fullerene having a cavity therein, that is "carbon nano-particle" and the concentric true sphere-type fullerene having no cavity can be regarded as a cage transformation of graphite. The latter true sphere-type fullerene is a kind of unstable phase as described below, and it is considered that the latter true sphere-type fullerene changes to a stable polyhedron-type fullerene having no cavity by heat treatment.

However, the studies on nano-size particulate graphite have been undertaken by making use of fullerene black as a raw material. Since it is, however, difficult to separate amorphous carbon or other products contained in the fullerene from the nano-size particulate graphite, the nano-size particulate graphite itself has not been isolated yet. Further, an effective method for preparing the nano-size particulate graphite has not yet developed. It is, therefore, the present condition that the properties of the nano-size particulate graphite have not been clarified yet.

DISCLOSURE OF THE INVENTION

For such reasons as above described, it has been eagerly required to produce nano-size particulate graphite efficiently and in high purity and to clarify its properties.

That is to say, a problem of the present invention is to provide a process for preparing nano-size particulate graphite efficiently and in high purity and to provide high-purified nano-size particulate graphite produced by the process.

The inventor of the present invention has studied devotedly in order to solve the above-described problem. In the process of our studies, soot-like carbon having a grape-like aggregate structure of nano-primary particles formed by stacking irregular concentric spheres in multiple layers was irradiated with high energy beam such as strong electron rays for a short time. As a result, it has been surprisingly observed that the primary particles changes to true sphere-like carbon nano-onion and simultaneously the aggregate is transformed to a state that particles are dispersed.

It has been considered that the carbon black does not take a micro structure having three-dimensional regularity such as graphite, but is not perfect amorphous, and that the carbon black shows broad absorption in the vicinity of low diffraction angle of 20–30° in powder X-ray diffraction and has a partial structure in which nano-size carbon flakes comprising multi-nucleus aromatic skeleton are stacked in multiple layers. For this reason, the carbon black is called as low regularity carbon. When such carbon intact is heat-treated at temperatures of 3000° C. and above, there is a case where it is graphitized such as pitch coke (easily-graphitization carbon). However, it becomes generally a concentric polyhedron-type micro particle having faces formed by minute graphite layers stacked and having a big cavity therein. The latter is not graphitized, even if it is heated at high temperatures (hard-graphitization carbon). When, however, the micro structure of the carbon black or soot before heat-treatment is well observed, it appears that substantial sphere nano-size particles aggregate in a state of grape and the primary particle has a lamellar structure.

It has been believed from X-ray analysis that such a lamellar structure is formed by depositing plane-like graphite crystallites having an average size of 1.7 nm repeatedly in the direction parallel to a spherical surface. It can be, therefore, said that the above-described discovery by the inventors of the present invention is entirely surprising.

The inventors of the present invention have devotedly studied the structure of low regularity graphite independently from the theory of crystallite graphite which has been conventionally believed to be true. As a result, we have succeeded in producing nano-size particulate graphite efficiently and in high purity and accomplished the present invention.

That is to say, the present invention relates to a process for producing nano-size particulate graphite comprising: irradiating carbon having a micro structure which is a grape-like aggregate of nano-primary particle formed by stacking irregular concentric spheres in multiple layers, said primary particle having no cavity therein and a diameter of approximately 10 to 100 nm with high energy beam.

Further, the present invention relates to the above-described process characterized in that the nano-size particulate graphite is true sphere.

Further, the present invention relates to the afore-mentioned process characterized in that heat-treatment is carried out after irradiation with high energy beam.

Further, the present invention relates to the afore-mentioned process characterized in that nano-size particulate graphite is polyhedron.

Further, the present invention relates to a process for producing nano-size particulate graphite comprising irradiating soot-like carbon which is obtained by incomplete combustion or thermal cracking of a carbon-containing compound such as hydrocarbon, aromatic oil and so on with high energy beam.

Further, the present invention relates to the above-described process characterized in that the soot-like carbon is carbon black.

Further, the present invention relates to the above-described process characterized in that the nano-size particulate graphite is true sphere.

Further, the present invention relates to the above-described process characterized in that heat-treatment is carried out after irradiation with high energy beam.

Further, the present invention relates to the above-described process characterized in that nano-size particulate graphite is polyhedron.

Further, the present invention relates to the above-described process characterized in that the high energy beam is at least one selected from the group consisting of electron rays, gamma rays, X-rays and beam from an ion source.

Further, the present invention relates to nano-size particulate graphite produced by any one of the above-described processes.

While there is a portion which is not yet clear with respect to the mechanism of the formation of nano-size particulate graphite of the present invention, it can be inferred, on the whole, to be as follows:

The afore-mentioned theory of graphite crystallite on carbon black has been considered to be high reliable because it has been derived from the results of X-ray analysis. However, the theory of graphite crystallite is unfavorable, because numerous atomic bonds are left at the ends of the crystallite without being bonded. It is rather natural to consider that the carbon black takes, on the whole, the structure analogous to that of carbon nano-onion having numerous defects, because there are many cases where a five-membered ring is formed when adjacent crystallites are bonded each other. It can be understood that the five-membered ring formed has been probably overlooked by X-ray analysis, because the diffraction strength of X-ray is extremely low relative to the structure around the five-membered ring irregularly distributed. When the carbon black is heat-treated, the heat relaxation proceeds preferentially, because more time is required for elevation of interior temperature. Accordingly, the minute graphite structure grows toward graphite which is the most stable structure of carbon. However, particulate structure can be maintained because the five-membered ring does not disappear by heating. Therefore, the carbon black is supposed to have changed to such hard-graphitized carbon as described above. It is considered that a big cavity inside the carbon results from gas generated by thermal cracking of impurities and the like. However, when the interior temperature is increased within such a short range of time that does not allow relaxation for graphite structure or decomposition of impurities to occur by irradiating the carbon black with high energy beam, it is considered that the carbon black changes toward carbon nano-onion which is near the minimum point of energy on the surface the energy at which is over the energy radiated.

EMBODIMENT FOR CARRYING OUT THE INVENTION

Figure 1:
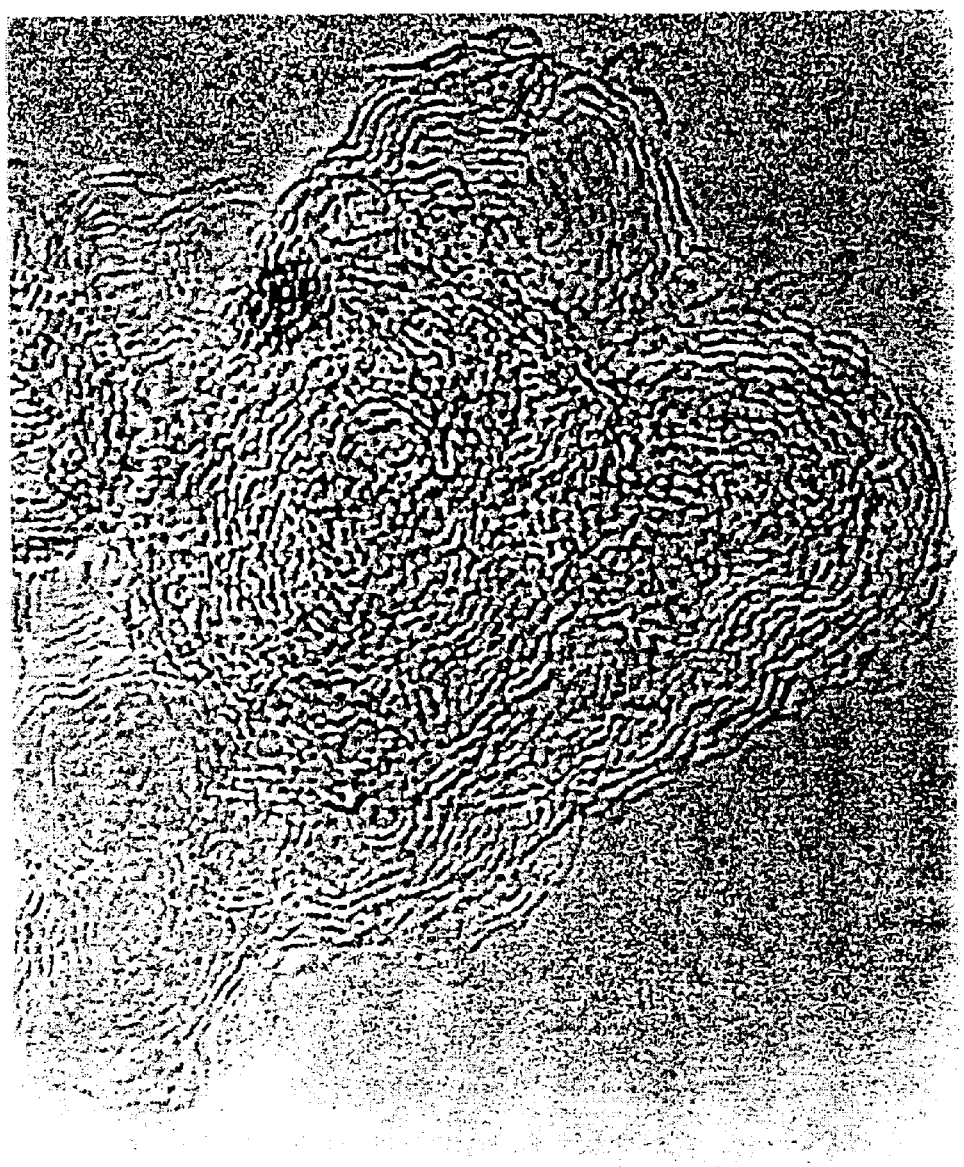
FIG. 1 is a high-resolution transmission electron micrograph showing a part of the structure of aggregate of ultra fine furnace black and particles inside thereof.

According to the present invention, an example of carbon having a micro structure which is a grape-like aggregate of nano-primary particle formed by stacking irregular concentric spheres in multiple layers, said primary particle having no cavity therein and a diameter of approximately 10 to 100 nm is soot-like carbon obtained by incomplete combustion or thermal cracking of a carbon-containing compound such as hydrocarbon, aromatic oil and so on and is typically carbon black. As the carbon black is preferable a highly purified product having the structure that multi-layer spherical shell structure of primary nano-particles constituting the micro-aggregate grows into inside of the particle.

In general, the size of the primary nano-particle of carbon black is from 10 to 1000 nm. Since, however, there is a tendency that the regularity of the inside structure of the primary particle lowers as the particle is big, the particle having a small diameter is preferable in order to achieve the object of the present invention. That is to say, according to the present invention, the particle having a diameter of from 10 to 100 nm is preferably used, and the particle having a diameter of from 10 to 15 nm is more preferably used. While the particulate aggregate structure peculiar to carbon black is strengthened by a thin layer-like carbon crosslinked between the particles, the crosslinked structure is broken and disappeared by irradiation with strong electron rays.

The high energy beam used in the present invention is beam having high energy such as electron rays, gamma rays, X-rays or beam from an ion source and so on. It is required to monitor the process of transformation of the structure of the primary particle by means of an electron microscope.

For example, when electron rays are used as high energy beam, it is preferable to increase the current density by virtue of heating, an inert atmosphere or high vacuum, increase in electrical voltage, beam concentration and so on, or it is preferable to irradiate while adjusting appropriately the time for irradiation. This is because that the electric density under a usual electron rays-irradiating apparatus is low compared with that inside an electron microscope. Also, when the high energy beam other than electron rays is used, it is preferable to carry out appropriately, taking the above-described points into account.

Production of the nano-size particulate graphite on a commercial scale can be carried out by selecting the carbon black having a particle diameter of 10 to 100 and below, more preferably 10 to 20 and below and irradiating it with strong electron rays for a short time. Time for irradiation depends on both the strength of electron rays and the degree of vacuum, and the former depends on both the accelerating voltage and the current density. It is preferable to carry out irradiation in high vacuum.

EXAMPLE

The present invention is described below more in detail with reference to an example of the present invention, but not limited thereto.

A certain amount of commercially available ultra fine-grade carbon black ("TOKABLACK # 8500/F" for color conductivity produced by TOKAI CARBON CO. LTD. was pulverized by an agate mortar, and suspended in acetone maintained at room temperature, and then subjected to ultrasonic treatment for three minutes. Supernatant liquid was scooped up by a copper grid coated with a carbon film and first observed its transmitted image under a pressurized voltage of 200 kv by the use of an electron microscope made by NIHON DENSHI CO., LTD. As shown in FIG. 1, a grape-like aggregate structure composed of irregular spherical nano-particles is observed. A basic nano-particle has an average diameter of 14 nm, and a state is shown that several particles are covered up with several layers of carbon layer to form strong aggregate.

Figure 2:
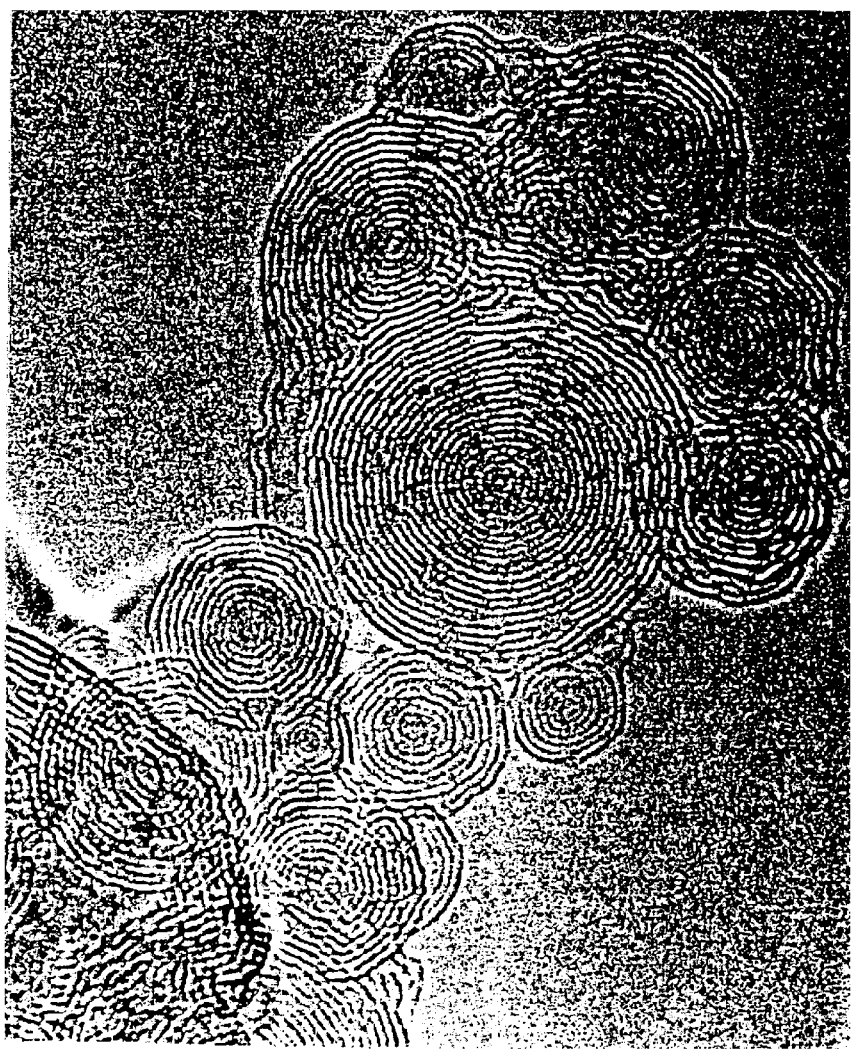
FIG. 2 is a high-resolution transmission electron micrograph showing a true sphere-type stacking structure of carbon nano-onion obtained by irradiating the same sample of furnace black as that shown in FIG. 1 with strong electron rays.

Next, a diaphragm for electron rays was removed so as to pass whole electron rays through a specimen, and the current density was increased up to the maximum. When irradiation was carried out for four minutes, the grape-like aggregate structure composed of irregular spherical nano-particles which were initially present disappeared and whole particles changed to particulate graphite. Hereinafter, the particulate graphite is referred to as "carbon nano-onion" because it is a true sphere. Such state is shown in FIG. 2. While the diameter of the carbon nano-onion is substantially the same as that of the basic particle before irradiation, the distance between spherical shells decreases to 0.340~0.35 nm from 0.35~0.38 nm before irradiation and approaches 0.335 nm which is the distance between graphite layers.

INDUSTRIAL APPLICABILITY

It can be anticipated that the fact that the present invention made it possible for the first time to isolate the carbon expected as "ultimate fullerene" extremely simply and efficiently gives inestimable effect to the carbon material-related art field.

The production cost of $C_{60}$ and carbon nano-tube are not yet short of ¥1,000,000 per kg. Contrary to this, since the carbon nano-onion can make use of the so-called heaven-sent ideal raw material, that is, carbon black which is extremely cheap and highly purified carbon, it is worthy of being noticed that the fact that the carbon nano-onion has from the beginning overwhelming advantageous cost factors as a fullerene-group material.

The carbon nano-onion of the present invention can immediately find its way into many promising industrial applicability with reference to many useful properties and uses having been discovered for $C_{60}$, $C_{70}$, and mono-layer and multi-layer carbon nano-tubes. However, it can be easily anticipated that there are many unique uses on the basis of the characteristics peculiar to the carbon nano-onion, that is, mesoscopic particle size beyond the category of molecule, unique true spherical form which has been hardly seen, resistance to fracture resulted from such an onion structure that even if the outermost surface is broken, a new surface similar thereto appears always from the inside and so on. While several examples of the use of the carbon nano-onion of the present invention are shown below, more stable nano-size polyhedron-type graphite formed by subjecting the carbon nano-onion to heat-treatment can be used for similar uses.

(1) Hydrogen Storage Material

While a fullerene $C_{60}$ is an effective hydrogen carrier, a hydrogen addition reaction does not proceed as expected due to steric hindrance by a high hydrogen-added adduct. Since, however, the surface of the carbon nano-onion is a high reactive giant fullerene, the carbon nano-onion has no drawback in size which has been seen in the minimum fullerene $C_{60}$ and is promising for a hydrogen storage material for its cheapness. A cheap and light hydrogen storage material is used for a fuel cell-driven automobile.

(2) Light Absorbent

While one of a most promising use of $C_{60}$ is an optical limiter, the carbon nano-onion is expected to have high absorbing capability per unit weight, because all the fullerene shell constituting the carbon nano-onion can work as a light absorbent independently. If a polar group is added on the surface of a thin film small carbon nano-onion, it may be possible to make a water soluble optical limiter.

(3) Super Hard Material

Since the carbon nano-onion has no weak cavity in a particle, it has high resistance against deformation. It is, therefore, expected that not only individual particles but also aggregate thereof show high hardness and that the carbon nano-onion can resist against severe weight load; which is well comparable to the fact that the carbon nano-tube has possibility that it becomes probably a fiber material showing the highest tensile strength on earth.

(4) Raw Material for Micro Diamond

It is known that when the carbon nano-onion is irradiated with electron rays while heating, phase transition to diamond occurs inside the particle. The transition has conventionally been carried out only in an electron microscope. According to the present invention, however, there are prospects for mass production of micro diamond from carbon black.

(5) Rubber Reinforcing Agent

If the technology for producing carbon nano-onion or nano-size polyhedron-type graphite from carbon black at low cost on a large scale is completed by carrying out the present invention, it is possible to replace a part of the use of the carbon black with another use. 96 percent of the use of carbon black is for a rubber and 60 percent or more thereof is for a tire. It can be easily anticipated that the carbon nano-onion shows excellent properties superior to those of carbon black, if high cohesive carbon black is compared with carbon nano-onion basically having a state that molecules are distributed with respect only to bound rubber and carbon gel which are factors for rubber reinforcement.

(6) Metal Nano-capsule

A metal nano-capsule has been produced by applying arc-discharge to graphite formed by incorporating metal into the graphite and baking. Since, however, vaporization process is through high temperature near 5000° C. in the case of arc-discharge, it has been difficult to control capsule size or to isolate by-products such as carbon nano-tube, fullerene, amorphous carbon and so on from metal nano-capsule. It is anticipated that if irradiation with high energy beam such as electron beam and so on is carried out under coexistence with metal after carbon nano-onion has been isolated and purified, recomposition or shrinkage of the fullerene shells constituting the carbon nano-onion occurs and metal enters the inside of the onion. Preliminary experiments therefore are carried out. The metal nano-capsule is expected to have extensive applications such as a magnetic recording medium, radioactive isotope treatment and so on. It is, therefore, expected that selective production of the metal nano-capsule is made possible.

What is claimed is:

1. A process for preparing nano-size particulate graphite comprising:

providing a carbon having a micro structure including a grape-aggregate structure of nanoprimary particles, said aggregate structure formed by stacking irregular concentric spheres of said carbon in multiple layers, said nanoprimary particles having no cavity therein and a diameter of approximately 10 to 100 nm; and irradiating said nanoprimary particles with a high energy beam to transform said particles into said nano-size particulate graphite.

2. A process described in claim 1, wherein the irradiating prepares a true sphere of the nano-size particulate graphite.

3. A process described in claim 1, further comprising:

heat treating after irradiation with the high energy beam.

4. A process described in claim 3, wherein the irradiating prepares a polyhedron of the nano-size particulate graphite.

5. A process described in claim 1, wherein the irradiating with the high energy beam irradiates with at least one of electron rays, gamma rays, X-rays, and beams from an ion source.

6. A process for preparing nano-size particulate graphite comprising:

providing a carbon soot obtained by incomplete combustion or thermal cracking of a carbon-containing compound, said carbon soot including nanoprimary particles having a diameter of approximately 10 to 100 nm; and irradiating said nanoprimary particles with a high energy beam to transform said particles into said nano-size particulate graphite.

7. A process described in claim 6, wherein the irradiating said nanoprimary particles irradiates carbon black.

8. A process described in claim 7, wherein the irradiating prepares a true sphere of the nano-size particulate graphite.

9. A process described in claim 7 further comprising:

heat treating after irradiation with the high energy beam.

10. A process described in claim 6, wherein the irradiating prepares a true sphere of the nano-size particulate graphite.

11. A process described in claim 6, further comprising:

heat treating after irradiation with the high energy beam.

12. A process described in claim 11, wherein the heat treating prepares a polyhedron of the nano-size particulate graphite.

13. A nano-size particulate graphite comprising:

a true sphere including spherical graphitic shells having a separation distance of less than 0.35 nm.

* * * * *